US006475421B2

(12) United States Patent
Niwano et al.

(10) Patent No.: US 6,475,421 B2
(45) Date of Patent: Nov. 5, 2002

(54) METHOD OF MANUFACTURING A REGULATING BLADE FEATURING A CURVED SUPPORTING LAYER

(75) Inventors: Kentaro Niwano, Tokyo (JP); Masahiro Watabe, Yokohama (JP); Noriyuki Yanai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/881,667

(22) Filed: Jun. 18, 2001

(65) Prior Publication Data

US 2001/0041264 A1 Nov. 15, 2001

Related U.S. Application Data

(62) Division of application No. 08/991,439, filed on Dec. 16, 1997, now abandoned, which is a continuation of application No. 08/375,990, filed on Jan. 20, 1995, now abandoned.

(30) Foreign Application Priority Data

Jan. 31, 1994 (JP) ................................................ 6-9875

(51) Int. Cl.[7] .......................... B29C 45/14; B29C 53/16
(52) U.S. Cl. ........................ 264/266; 264/259; 264/296
(58) Field of Search ................................ 264/259, 265, 264/275, 294, 296, 266, 295, 230, 254

(56) References Cited

U.S. PATENT DOCUMENTS

| | | | | | |
|---|---|---|---|---|---|
| 3,077,658 | A | * | 2/1963 | Wharton | 264/259 |
| 3,246,066 | A | * | 4/1966 | Gits | 264/259 |
| 4,247,196 | A | | 1/1981 | Ogawa et al. | 355/15 |
| 4,566,402 | A | | 1/1986 | Shimazaki | 118/653 |
| 4,579,081 | A | | 4/1986 | Kohyama | 118/651 |
| 4,770,836 | A | * | 9/1988 | Vetter et al. | 264/259 |
| 5,142,330 | A | | 8/1992 | Hirano et al. | 355/259 |
| 5,204,034 | A | | 4/1993 | Sasame et al | 264/138 |
| 5,353,104 | A | | 10/1994 | Kato et al. | 355/259 |
| 5,450,184 | A | | 9/1995 | Yanai et al. | 355/299 |
| 5,519,472 | A | | 5/1996 | Ojima et al. | 355/246 |
| 5,531,950 | A | * | 7/1996 | Kimura et al. | 264/265 |
| 5,713,120 | A | * | 2/1998 | Watabe et al. | 29/527.4 |
| 5,978,636 | A | * | 11/1999 | Yamamoto et al. | 399/284 |
| 5,997,675 | A | * | 12/1999 | Miyake et al. | 264/266 |

FOREIGN PATENT DOCUMENTS

| | | |
|---|---|---|
| JP | 60-53972 | 3/1985 |
| JP | 61-28973 | 2/1986 |
| JP | 61-29866 | 2/1986 |
| JP | 63-226680 | 9/1988 |
| JP | 4-204678 | 7/1992 |
| JP | 4-344668 | 12/1992 |
| JP | 6-348119 | 12/1994 |

OTHER PUBLICATIONS

Patent Abstracts of Japan, vol. 9, No. 182 (P–376) (JP 60–53972, Mar. 28, 1985), Jul. 27, 1985.
Patent Abstracts of Japan, vol. 10, No. 180 (P–471) (JP 61–28973, Feb. 8, 1986), Jun. 24, 1986 and English translation.
Patent Abstracts of Japan, vol. 10, No. 183 (P–472) (JP 61–29866, Feb. 10, 1986), Jun. 26, 1986.
English translation and Abstract.

* cited by examiner

*Primary Examiner*—Angela Ortiz
(74) *Attorney, Agent, or Firm*—Fitzpatrick, Cella, Harper & Scinto

(57) ABSTRACT

An elastic blade regulates the layer thickness of a toner used in the developing device of an image forming apparatus such as an electrophotographic apparatus. The elastic blade is manufactured by providing a metal layer consisting of a rolled metal. The metal layer has a warped shape including a convex side caused by rolling the metal layer. A rubber layer is provided only on a surface of the metal layer at the convex side thereof.

6 Claims, 2 Drawing Sheets

METHOD OF MANUFACTURING A REGULATING BLADE FEATURING A CURVED SUPPORTING LAYER

This application is a divisional of application Ser. No. 08/991,439, filed on Dec. 16, 1997, which is a continuation of application Ser. No. 08/375,990, filed on Jan. 20, 1995, both now abandoned.

BACKGROUND OF THE INVENTION

1. Field of the Invention

This invention relates to an elastic blade for regulating the layer thickness of a toner, a method of manufacturing the same and a developing device using the elastic blade.

2. Related Background Art

Heretofore, in the developing device of an image forming apparatus such as an electrophotographic apparatus, the thickness of a toner layer on a developing sleep carrying a toner thereon has been regulated by an elastic blade and triboelectricity has been imparted to the toner by friction.

A blade made of rubber is used as such elastic blade.

However, this rubber blade, when used for a long period, has caused a variation with time (plasticity deformation) in its elastic material and has suffered from a problem in durability.

So, there has been proposed a developing device utilizing, as a blade for regulating the quantity of developer, a blade of two or more layers comprised of an elastic layer for regulating the amount of charge of a developer and a support layer for regulating pressure adhesively secured to the elastic layer.

However, the support layer of this blade of two-layer construction is thin and elongate and therefore gives rise to warp.

For this reason, this blade is affected by the warp of the support layer and it is difficult to obtain uniform contact pressure in the lengthwise direction of a developing sleeve and therefore, it would occur to mind to form a blade for regulating the quantity of developer which is high in flatness. If the flatness of the blade for regulating the quantity of developer is thus made high, the toner could be uniformly regulated and charged in the whole widthwise direction on the sleeve and the pressure regulation by space saving, low cost and highly accurate setting will not be required.

For this purpose, however, the flatness of the support layer must not be made high and the manufacturing process becomes complicated and difficult.

SUMMARY OF THE INVENTION

It is an object of the present invention to provide an elastic blade which is high in flatness and a method of manufacturing the same.

It is another object of the present invention to provide an elastic blade having a base layer and an elastic layer provided on the convex surface side of said base layer.

It is still another object of the present invention to provide a method of manufacturing an elastic blade having the step of forming a curved base layer, and the step of thermally securing and shaping an elastic layer on the convex surface side of said base layer.

It is yet still another object of the present invention to provide a developing device having a toner carrying member for carrying a toner thereon, and a regulating blade for regulating the layer thickness of the toner on said toner carrying member, said regulating blade having a base layer and an elastic layer provided on the convex surface side of said base layer, said elastic layer side being urged toward said toner carrying member.

Further objects of the present invention will become apparent from the following detailed description.

DETAILED DESCRIPTION OF THE PREFERRED EMBODIMENT

Figure 1:
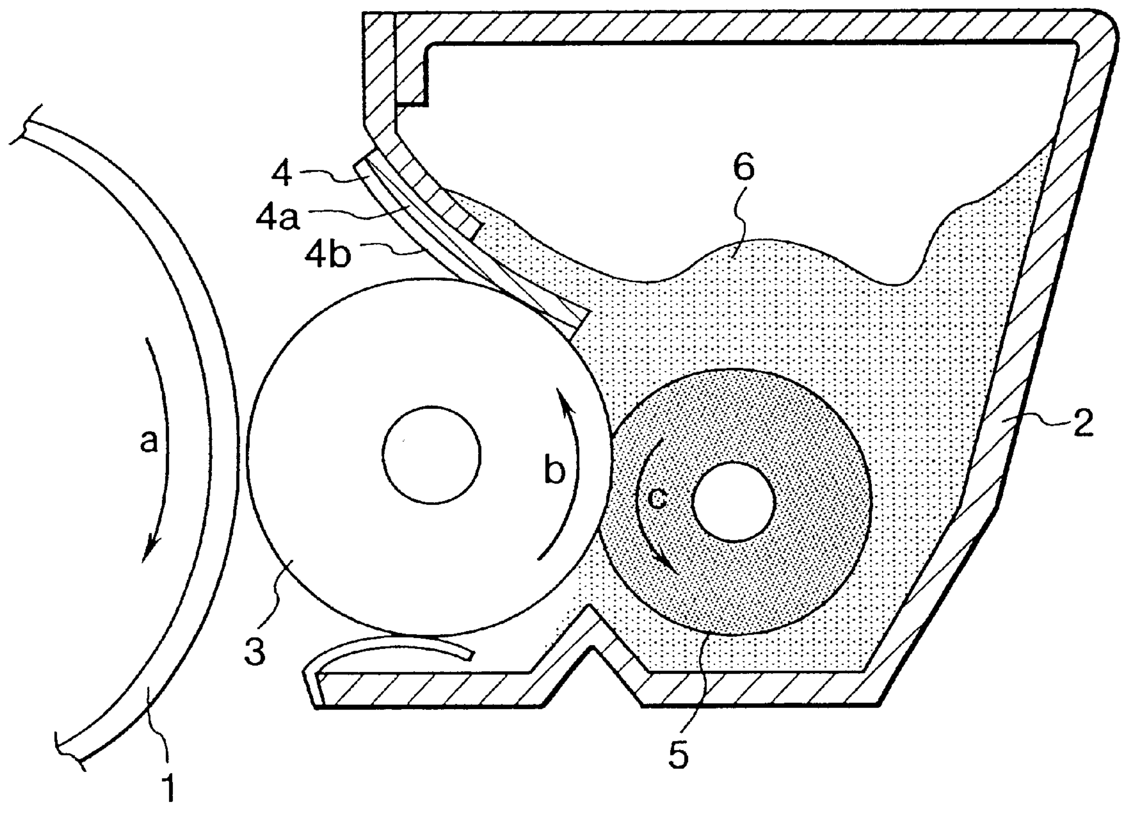
FIG. 1 is a cross-sectional view of a developing device.

FIG. 1 is a cross-sectional view of a developing device according to an embodiment of the present invention.

A regulating blade 4 which is an elastic blade bears against a developing sleeve 3 which is a toner carrying member opposed to a photosensitive member 3 which is an image bearing member bearing an electrostatic latent image thereon, carrying a toner 6 thereon and being rotated, and regulates the layer thickness of the toner and also imparts triboelectricity to the toner by friction.

In the present embodiment, a one-component developer is used as the toner.

The regulating blade 4 bears against the developing sleeve 3 so as to be in a counter direction to the direction of rotation b of the developing sleeve, that is, so that the free end of the regulating blade 4 which bears against the developing sleeve 3 may be upstream of the end of the regulating blade 4 which is fixed to a developer container 2, with respect to the direction of rotation b.

Description will now be made of the blade 4 of the present embodiment and a method of manufacturing the same.

Figure 2A:
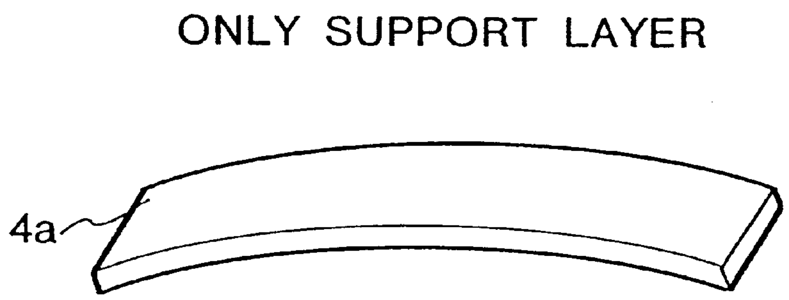
FIGS. 2A and 2B show an elastic blade.
Figure 2B:
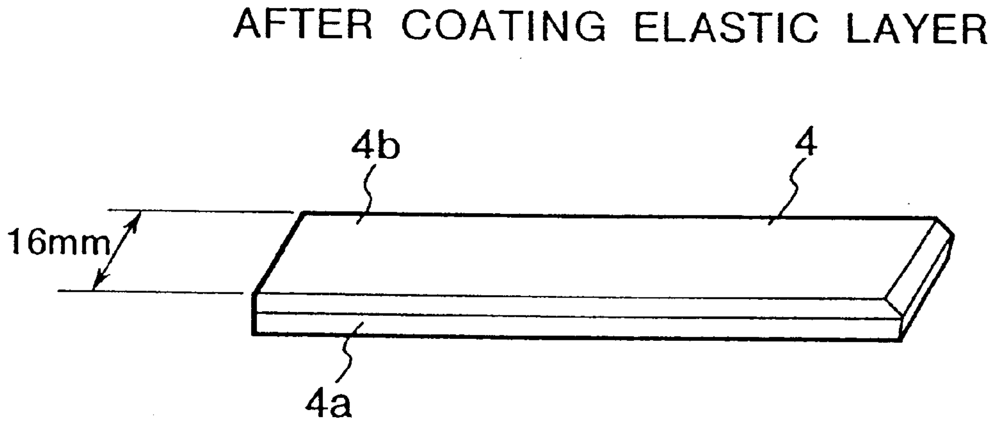

As shown in FIGS. 2A and 2B, the regulating blade 4 of the present embodiment is of a two-layer construction comprising a support layer 4*a* which is a base layer for regulating pressure and an elastic layer 4*b* for regulating the amount of charge, and is characterized by a construction in which the elastic layer 4*b* is formed on the convex side surface of the support layer 4*a* curved in the lengthwise direction thereof and caused by the warp thereof.

The method of shaping this regulating blade adopts a method of integrally thermally securing and shaping the elastic layer on the convex side surface of the support layer. At that time, by selecting such a material that the amount of thermal contraction of the elastic layer is greater than the amount of warp of the support layer and the shape of the support layer after the elastic layer has been thermally secured to the support layer becomes warped toward the elastic layer side, it is possible to make a flat regulating blade.

A member usable as the support layer is a metallic flat plate such as a stainless steel plate, a phosphor bronze plate or an aluminum plate having a thickness preferably in the range of 20 μm–500 μm in connection with the pressure contact force thereof with the developing sleeve, or a flat plate made of resin, for example, a springy hard elastic member such as a polyethylene terephthalate resin plate, a polycarbonate resin plate or a ductile polypropylene resin plate having a thickness preferably in the range of 50 μm–100 μm.

Description will be made here of the warp of SUS (stainless steel) foil or the like. For example, the amount of warp of SUS 60 μm CSP-H material is about 30 mm for a length of 365 mm. The cause of this is the accuracy tolerances of the circumferences of two upper and lower metallic rolls each having a mirror surface when the material is rolled by these two rollers. Therefore, even if the material is wound in advance around a circular paper tube or the like, the direction of warp does not depend on the direction of the winding. Also, the amount of warp of a metal such as SUS depends of the thickness thereof and if the thickness is great, the warp thereof will become small in the relation with the distortion thereof. Also, if a tension-annealed article (an article having its amount of warp modified) is used, the amount of warp will become small for the same thickness (but cost will become higher). Also, in the case of a scroll of resin such as PET, warp is created as a curl when the scroll is formed and therefore, the direction of warp can be made into the direction of winding.

Next, the rubber material of the elastic layer may preferably be HTV silicone rubber (such as high-temperature setting type millable silicone rubber), thermoplastic urethane rubber, liquid-like urethane rubber, liquid-like nitrile butadiene rubber or liquid-like silicone rubber (such as LTV or RTV), or an electrically insulative rubber elalstic material such as a denaturalized material or a blended material of the respective materials.

Also, the method of manufacturing the blade can be achieved by applying an adhesive agent to the convex side surface of the support layer for regulating pressure, integrally thermally securing and shaping the elastic layer for contact with the developer by injection molding, press molding or the like, forming it into a sheet of high smoothness, and thereafter cutting the sheet into any desired dimensions, thereby manufacturing the blade.

The manufacturing method of the present invention is a method of molding the support layer and the elastic layer integrally with each other, and examples thereof include a molding method using a flat plate molding mold using a mirror surface as the upper surface thereof in a flat heat press, to thermoset the elastic layer by heat and pressure and thermally weld it by a primer applied on the support layer (this method is effective when the material of the elastic layer is a material of high viscosity), a molding method of installing the support layer on the outer side in a centrifugal molding machine, applying heat thereto and thermosetting and thermally securing the elastic layer to the support layer while a drum is rotating (this method is effective when the material of the elastic layer is a material of low viscosity), a molding method of pouring a raw material into a metal mold comprising two longitudinally flat plates combined together, and thereafter applying heat thereto, thereby thermosetting the elastic layer and thermally securing it to the support layer (this method is effective when the material of the elastic layer is a material of low viscosity), and a molding method of using an injection molding machine to pour the material of the elastic layer into a flat plate molding metal mold having installed therein the support layer having a primer applied thereto (this method is effective both when the material of the elastic layer is a material of high viscosity and when the material of the elastic layer is a material of low viscosity).

The magnitude of the amount of warp of the support layer is coped with by changing the molding conditions and the shape conditions. For a support layer having great warp, it is effective to cope with by making the thickness of the elastic layer great and increasing the temperature during the formation of the elastic layer (high temperature molding), and for a support layer having small warp, it is effective to make the thickness of the elastic layer small and effect the molding of the elastic material by low temperature molding (this includes a secondary vulcanizing temperature condition). It is also possible to adjust the amount of warp by the time for the heat molding of the elastic layer (for a support layer having a small amount of warp, it is effective to lengthen the vulcanization of the elastic layer, and particularly when the temperature of secondary vulcanization is higher than the temperature of primary vulcanization, it is more effective to lengthen the time for secondary vulcanization).

Description will now be made of experimental examples based on the present invention and a comparative example.

Experimental Example 1

By the warp of stainless steel foil (SUS304CSP-H of a thickness 0.06 mm as a support layer 4*a,* a primer for silicone rubber is applied to the convex side surface thereof, and high temperature setting type LTV silicone rubber (Tore Dowcorning, liquid-like silicone rubber (LSR) DY35-7002) is integrally molded thereon at 120° C. for 5 minutes in a metal mold having its upper surface finished into a mirror surface, by an injection molding machine for rubber (produced by Matsuda Works, Ltd.), thereby forming an elastic layer 4*b* of silicone rubber having a thickness of 0.4 mm on the unwarped surface side of the stainless steel foil. Thereafter, as secondary vulcanization, it is left at it is in environment of 200° C. for 4 hours. Subsequently, after cooling, the cutting of a regulating blade is effected as shown in FIG. 2B by a cutting machine (a super-cutter produced by Ogino Seiki Co., Ltd.), and the cut blade is used as a blade for regulating the amount of developer.

Comparative Example

The molding method is the same as that in Experimental Example 1, and liquid-like rubber is thermoset on SUS foil of a thickness 0.06 mm by injection molding, and a rubber layer of a thickness 0.4 mm is molded in a metal mold. At this time, a primer is applied to the concave side surface of the SUS foil, and is coated with rubber. Thereafter, it is cut into the dimensions as shown in FIG. 2B by a cutting machine, and the cut product is used as a blade for regulating the amount of developer.

Experimental Example 2

An elastic material sheet is adhesively secured to SUS foil of a thickness 0.06 mm and is molded. At this time, an elastic material sheet already molded by heat molding or the like is adhesively secured to the convex side surface of the SUS foil. As the adhesively securing method at that time, the elastic material is adhesively secured to the SUS foil by the use of a both-surface tape without heat being applied thereto. After the adhesive securing and molding, the molded article is cut as shown in FIG. 2B and is used.

Experimental Example 3

An elastic material sheet is adhesively secured to SUS foil of a thickness 0.06 mm and is molded. At this time, an elastic material sheet already molded by heat molding or the like is adhesively secured to the convex side surface of the SUS foil. As the adhesively securing method at that time, use is made of a hot melt method of molding by applying heat, and the elastic material is adhesively secured to the SUS foil. After the adhesive securing and molding, the molded article is cut as shown in FIG. 2B and is used.

TABLE 1

| Adhesively Securing Method | Experimental Example 1 integral heat adhesion molding in mold | Comparative Example integral heat adhesion molding in mold | Experimental Example 2 both-surface tape adhesion | Experimental Example 3 hot melt adhesion |
|---|---|---|---|---|
| Surface for Adhesive Securing | convex side | concave side | convex side | convex side |
| Flatness (Amount of Float on a Fixed Board) | minute | great | small | small |
| Image-Density Irregularity | ○ | x (end portion) | Δ | Δ |
| White Streak Phenomenon | ○ | Δ (end portion) | Δ | Δ |

⊙ image density irregularity → evaluated by the degree of whitening of black density during whole surface solid black output
⊙ white streak phenomenon → evaluated by the degree of creation of while streaks during whole surface solid black output The result of the image output evaluation effected with the regulating blades molded by the experimental examples and the comparative example being mounted in a copying machine (NP1215 improved machine produced by Canon) is shown in Table 1 above.

By thus providing the elastic layer on the convex side of the base layer, it is possible to increase the flatness of the base layer.

Also as the method of adhesively securing the elastic layer, heat adhesive securing molding is preferable as can be seen from the experimental examples.

While some embodiments of the present invention have been described above, the present invention is not restricted thereto, but all modifications thereof within the scope of the technical idea of the invention are possible.

What is claimed is:

1. A method of manufacturing a blade for regulating a developer, said method comprising the steps of:

providing a curved supporting layer, said supporting layer having a convex side surface and a concave side surface on an opposite side of said convex side surface; and disposing an elastic layer on a convex side surface of said supporting layer while heat is applied, wherein a curve amount of said supporting layer is decreased by providing said elastic layer on said supporting layer.

2. A method according to claim 1, wherein said supporting layer is rolled metal.

3. A method according to claim 1, wherein said elastic layer is rubber.

4. A method according to claim 1, wherein said elastic layer is injection molded on said supporting layer.

5. A method according to claim 1, wherein a thickness of said supporting layer is in a range of 20 μm to 500 μm.

6. A method according to claim 1, wherein said elastic layer is contracted by said heat, thereby an amount of convexity of said supporting layer is decreased.

* * * * *